Feb. 15, 1966 G. MARTENS 3,235,717

MATRIX INFORMATION TRANSFORMING DEVICE

Filed Aug. 6, 1956 5 Sheets-Sheet 1

INVENTOR
Günther Martens
by: Cecily L. Frey
for Mestern & Frey

Feb. 15, 1966 G. MARTENS 3,235,717

MATRIX INFORMATION TRANSFORMING DEVICE

Filed Aug. 6, 1956 5 Sheets-Sheet 2

INVENTOR

Günther Martens by: Cecily L. Frey for Mestern & Frey

INVENTOR
Günther Martens
by: Cecily L. Frey
for Mestern & Frey

INVENTOR
Günther Martens
by: Cecil L Frey
for Mestern & Frey

MATRIX INFORMATION TRANSFORMING DEVICE

Filed Aug. 6, 1956 5 Sheets-Sheet 5

INVENTOR
Günther Martens
by Cecily L. Frey
for Meston & Frey

United States Patent Office 3,235,717

Patented Feb. 15, 1966

3,235,717

MATRIX INFORMATION TRANSFORMING DEVICE

Gunter Martens, Schliersee, Upper Bavaria, Germany, assignor to Kienzle Apparate G.m.b.H., Villingen, Black Forest, Germany Filed Aug. 6, 1956, Ser. No. 602,164

Claims priority, application Germany, Aug. 5, 1955, K 26,530

11 Claims. (Cl. 235—164)

Figure 1:
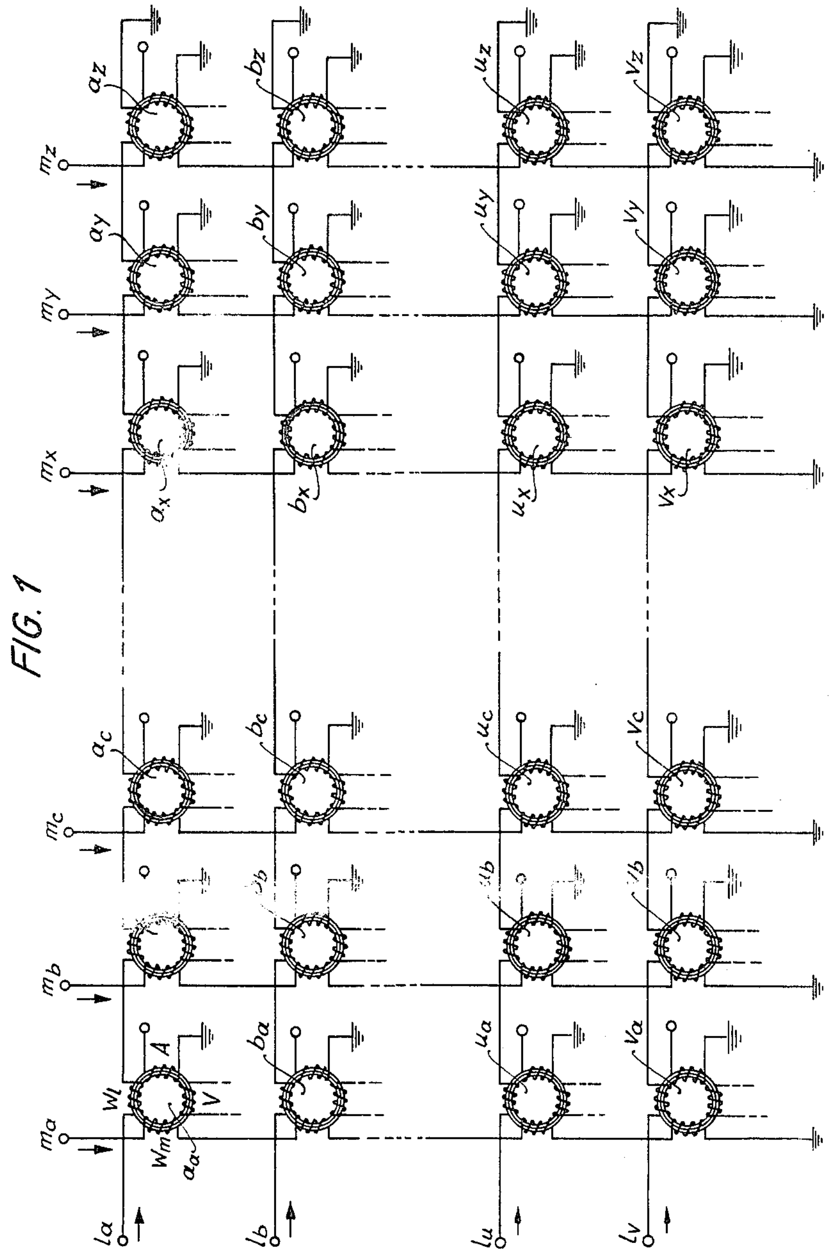

The invention refers to a device for transforming informations and/or processing data by means of transformation elements, which transform input informations to the corresponding output informations in logical combination. It is already known to use matrix arrangements of AND and OR switches for logically combining a plurality of input informations with one output information, such matrices having diode combinations arranged at the crossing points of the rows and columns. In order to obtain a plurality of output informations it has heretofore always been necessary to use multi-element switching arrangements.

It is the object of the invention to simplify such matrices and at the same time to increase their versatility. For this purpose the crossing points of the matrix consist of one-element switching arrangements each having more than two poles.

In the simplest case the switching arrangements at the crossing points of the matrix are multipolar units without amplifying qualities. In known information transforming devices, new signals or impulses are often weakened or changed in their form to such an extent that it is necessary to have regeneration stages in the following signal lines at corresponding distances, in order to give the signals their prescribed form and strength. To avoid such complicated arrangements multipolar transforming units are used which have at least such amplifying qualities as to enable them to regenerate the signals.

By replacing such regenerating stages, as for instance tube or transistor stages used heretofore with passive transforming elements or passive components, all failures due to the limited life and to the liability to disturbances of such regenerating stages are thereby obviated.

It is therefore another object of the invention to use such regenerating multipolar transforming units at the crossing points of the matrix which are practically free from wear and tear, do not change with time so that no errors will occur which are dependent on the durability of such parts.

As regenerating units, for instance, magnetic amplifiers may be employed, and especially transformers with saturable cores. Such transformers with saturable cores are transformers whose magnetic characteristics are extremely non-linear, and which have a rectangular hysteresis loop. Such transformers with saturable cores have amplifying qualities, when correspondingly arranged, and are stable in a plurality, especially two, discreet conditions.

It is already known to use transformers with saturable cores in matrix arrangements for storing informations by making use of their bi-stable characteristics. According to the invention, however, these transformers with saturable cores are used as information transforming elements serving to combine at least one output information with two input informations. In addition to that the information transforming elements can retain their quality of storing informations.

According to a further feature of the invention a distributing network may be connected to the information transforming elements combining input and output informations, such distributing network serving to lead the output informations to circuit arrangements for releasing impulse series. It is possible to provide electrically, preferably electronically selecting means in the distributing networks or in the circuit arrangements for releasing impulse sequences for selectably releasing various impulse sequences by means of the output informations, dependent on the problem that has just presented itself.

The method of logically combining at least one input information with at least one output information can be applied to a plurality of values and quantities, especially to logical, mathematical, physical, technical and similar vaues and quantities. The combination of the input values themselves in the matrix can be achieved by AND switches, OR switches etc. The output informations can selectably be introduced in one or several output circuit arrangements over one or several distributing networks. The arrangement of several distributing networks makes it possible to allocate several interpretations to one output information, such interpretations being predetermined by the switching arrangement with respect to the reversal of such switching arrangements in the distributing networks.

Without limiting the invention to a calculating device, it is well suited for the arithmetic combinaton of several input informations with at least one output information, i.e. for carrying through calculating operations. It is therefore a further object of the invention to provide a matrix as a calculating arrangement. In this case the result of the arithmetic combination of two one-digit decimal numbers can be looked upon as a two-fold output information, one of which later on to be called the "left-value," representing the tens digit, the other, later on to be called the "right-value," representing the units-digit of a two digit result. The distribution of such and other manifold output informations of the matrix can preferably be achieved by providing several distributing networks. These consist preferably of OR switches which lead the corresponding manifold output informations of the matrix over predetermined output ends of the distributing networks to devices for releasing impulse sequences, result accumulating devices etc. According to the further invention an especially suitable distribution of the manifold output informations is achieved by means of a new arrangement for the generation of impulses, which transforms signals arriving on several lines parallel to each other to impulse series. This arrangement will therefore be called a parallel to series transforming device.

One example of the use of the invention is a method for decimal multiplication. In this case the rows and columns of the matrix represent the figures 0 to 9 of the two factors, the multiplicand and the multiplier. A crossing point of one row and a column represents the logical combination of the two factors with the result, the product of the two factors. It is sufficient to obtain one output signal at the corresponding crossing point of the matrix, which will be led to the respective input circuit of the distributing network and will release signals, signal groups, impulse series and such like in subsequent circuit arrangements, such impulse series representing the result, i.e. in this case the product of the two input figures, coded in a sensible way.

The application of the invention for the multiplication will now be described with reference to the drawings.

Figure 2:
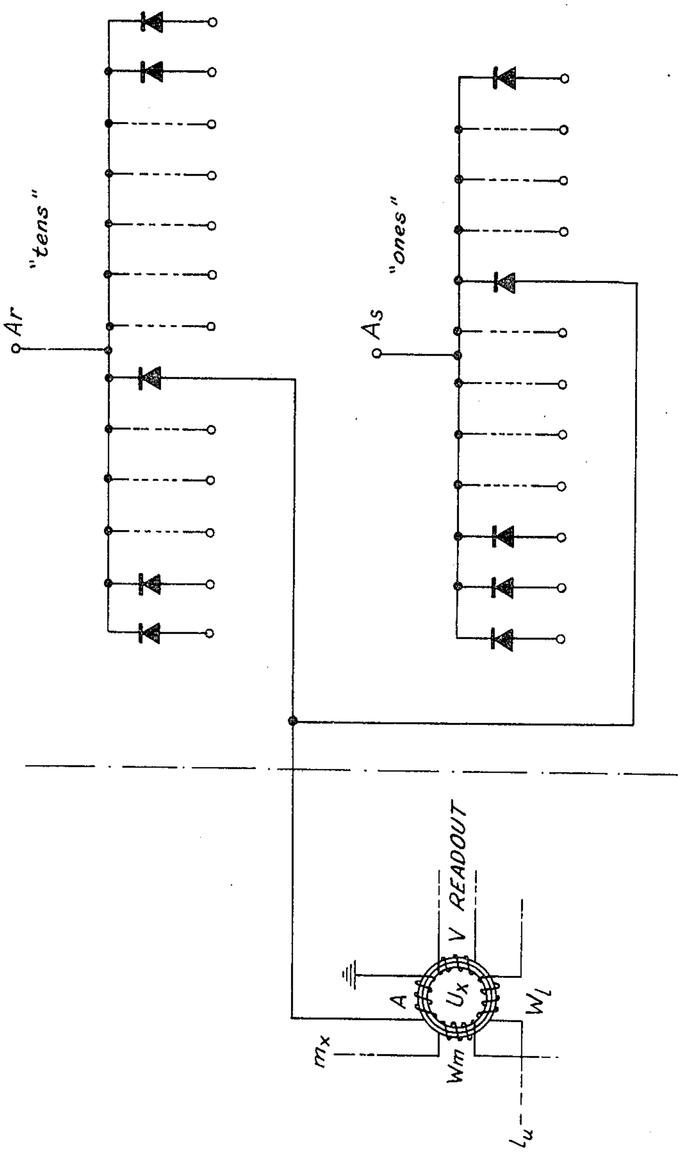
Figure 3:
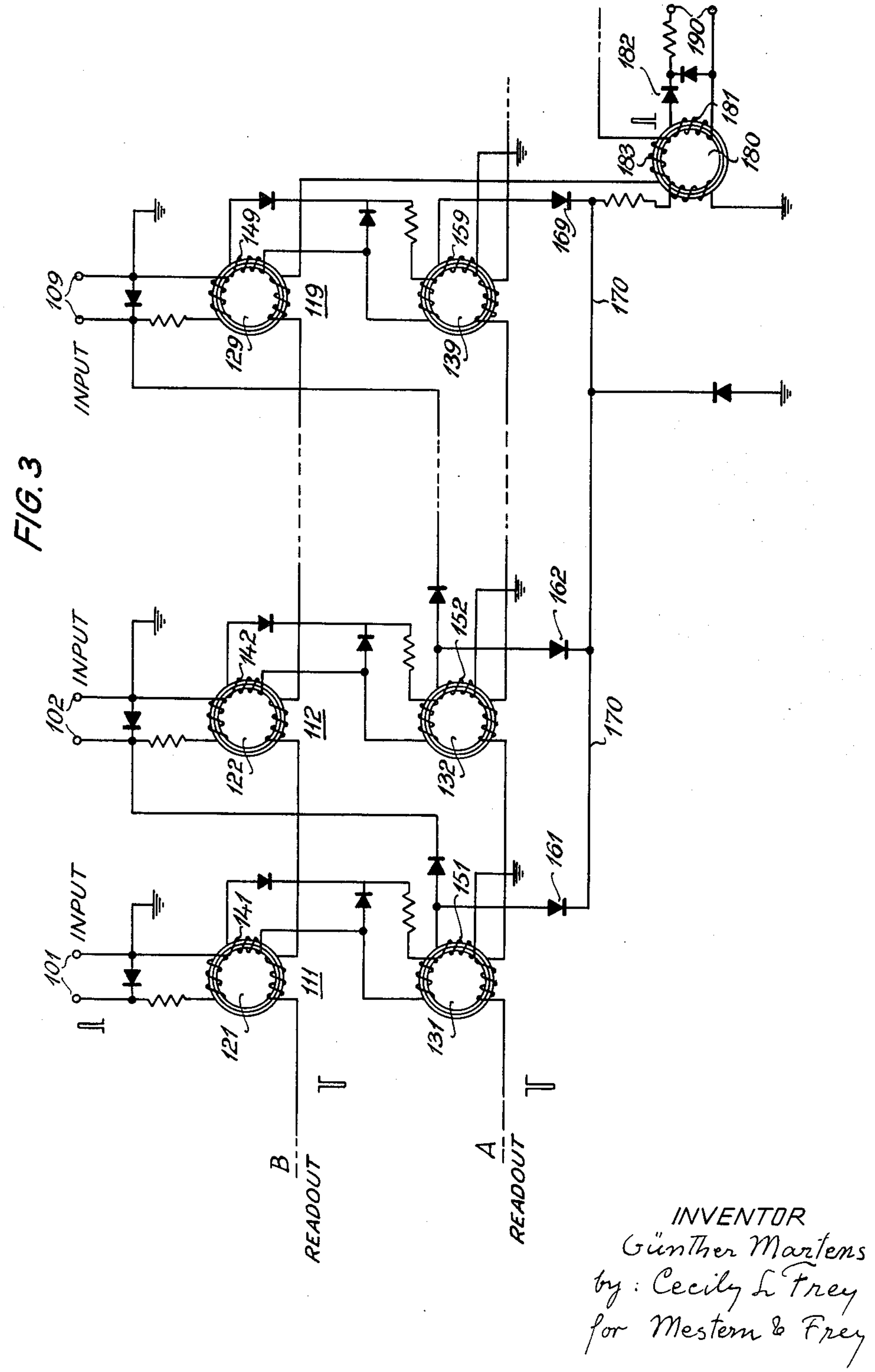
Figure 4:
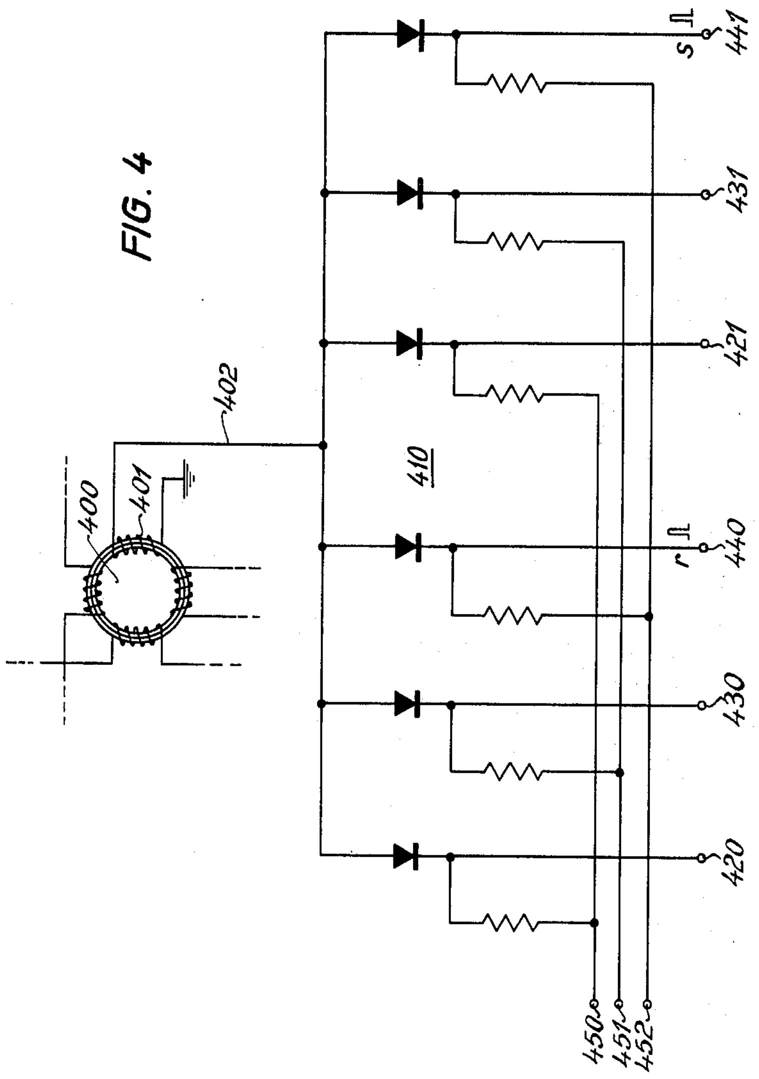
Figure 5:
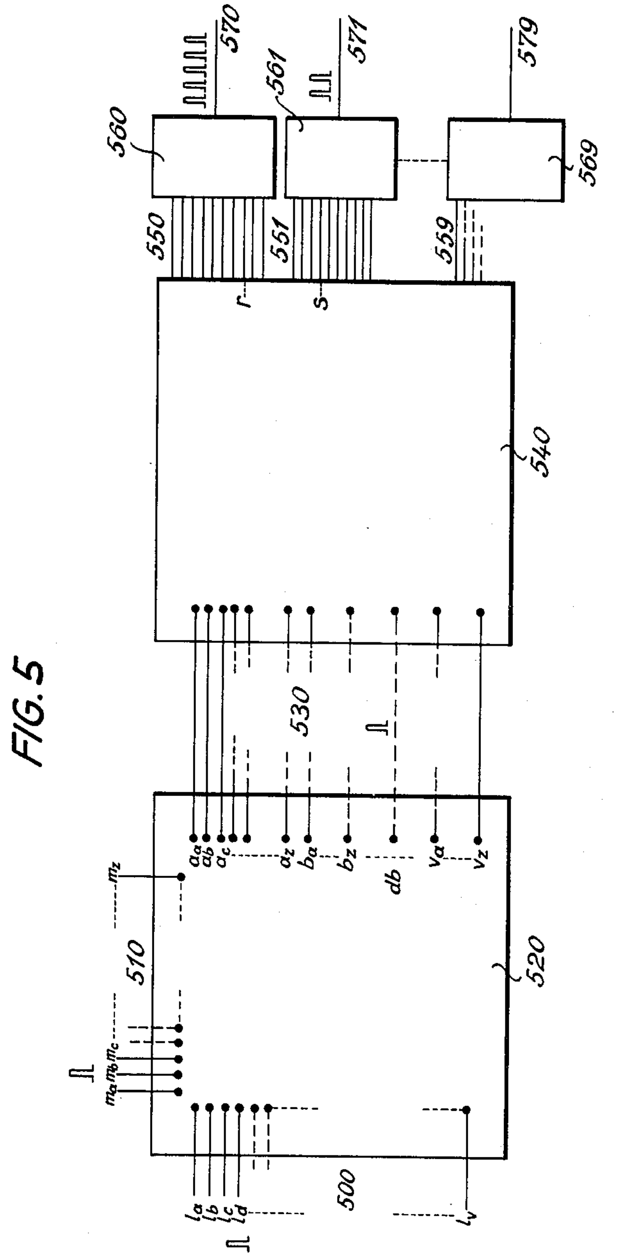

FIG. 1 shows a two dimensional matrix, the crossing points of which are formed by transformers with saturable cores, FIG. 2 illustrates a distributing network, which connects the output circuits of the crossing points of the matrix with the subsequent impulse generating arrangements, FIG. 3 shows a parallel to series transforming device as an example for an impulse generating arrangement for the purpose of representing the result, FIG. 4 illustrates a distributing network which may be electronically switched over, FIG. 5 an overall switching diagram for illustrating the interconnections between the circuit arrangements shown in FIGS. 1 to 4.

The two-dimensional matrix shown in FIG. 1 consists of $v$ rows $l_a$ to $l_v$ and $z$ columns $m_a$ to $m_z$. The crossing points of the matrix are formed by transformers with saturable cores $a_a$ to $a_z$, $b_a$ to $b_z$ . . . $v_a$ to $v_z$. Each single transformer with a saturable core has four windings, that is to say one winding $w_l$ allocated to the row, one winding $w_m$ allocated to the column, one advance winding V and one output winding A. All windings $w_l$ of the transformers of one row are connected in series, also all the windings $w_m$ of one column. The connections of the advance windings V and the output windings A will be explained below The cores of the transformers are preferably made of magnetic material having a rectangular hysteresis loop characteristic. Certain alloys of iron and nickel or ferrites are especially suited for this purpose. The two magnetic conditions of the transformers with saturable cores correspond to an extreme north-south and south-north magnetization and will in the following be called negative or positive saturation respectively. The normal condition of the matrix may be that in which all transformers have reached their negative saturation.

Negative impulses over the leads connecting the rows and columns in the direction of the arrows may have brought all transformers of the matrix into the condition of negative saturation which was assumed as a normal condition. The maximum impulses passing over the connecting leads of each row and of each column may each of itself not be sufficient to change the transformers, which it passes from its condition of negative saturation to the opposite condition of positive saturation. The sum of two impulses of equal direction on two windings of one transformer, however, will at any rate be sufficient to change the magnetic condition of the transformer. The transformer $a_a$, for instance, cannot be changed in its condition of saturation by one impulse only over either of the windings $w_m$ or $w_l$. However, if there are two impulses arriving over the winding $w_m$ and $w_l$ simultaneously, the transformer will for certain be changed in its condition of saturation. One positive impulse each arriving simultaneously in the direction of the arrow on the row $l_a$ and on the column $m_b$ will change the condition of one single transformer of the matrix from negative to positive saturation, i.e. the transformer $a_b$ at the crossing point of the row $l_a$ and the column $m_b$. The transformers $a_a$, $a_c$, to $a_z$ of the row $l_a$ and the transformers $b_b$ to $b_v$ of the column $m_b$ will remain unchanged in their condition of magnetic saturation. The transformers with saturable cores of the matrix in this case are AND-switches which change their condition only when they receive simultaneous impulses from the row and the column of their intersection point.

It must be mentioned that during the above described process the other two windings A and V of the corresponding transformer are not closed circuits and therefore do not disturb this process. To this end the windings A and V are either connected to high ohmic loads acting against the flow of current in the direction determined by this change of the magnetic condition of the transformer or to diodes which are blocked in this direction. It must also be said that the required magnetization field strength for magnetically introducing a signal from the columns and rows to the crossing points of the matrix can be produced in various ways. It can, for example, be produced in such a way that each of the two magnetization windings supplies half of the whole magnetization field strength required (from $-H_c$ to $+H_c$). It is also possible to supply each transformer with a relatively high field strength against the negative coercitivity over an additional auxiliary winding, so that both magnetization windings have to produce such great reverse field strength magnetization that only the coincident energization of the two windings will effect the full reverse magnetization.

This arrangement not only permits the accumulation of coincident processes on the rows and columns at the crossing points of the matrix by reverse magnetization of the transformers, but also makes it possible to form logical combinations between the output networks connected to the windings A and the coincident sources connected to the windings of the rows and columns of the matrix. For the purpose of reading out the informations accumulated in the matrix, according to the invention, reading impulses will be given onto the advance windings V of the matrix in subsequent reading processes, which on their part will effect an output impulse on the output winding A of those transformers whose magnetic condition had previously been changed. The output winding A of the transformer of each crossing point is connected to other circuit arrangements over distributing networks, such circuit arrangements corresponding to their logical combination with the coinciding sources, as the problem may have presented itself. It may be required, for instance, that the multiplication of two values $u$ and $x$ should have a result which can be presented by two impulse series, each on two output lines respectively, of the output network. Such impulse series on the output lines of the output networks should correspond, for instance, to the left and right value of the product of the two factors $u$ and $x$. The coding of the impulse series is of no importance in this connection. In the example chosen the product of the two factors $u$ and $x$ may have to be presented by a series of $r$ impulses on the left value output line and $s$ impulses on the right value output line. For this purpose the output winding A, e.g. of the transformer with saturable core $u_x$ of FIG. 2 may be connected to a distributing network of two groups of diodes, the output end $A_r$ of one of the diode lines and the output end $A_s$ of the other diode line receiving one impulse each at the moment of the reading of the matrix by means of the reading impulse applied to winding V. If none of the other transformers of the matrix had previously been brought to its condition of reverse magnetization there will be no output impulses on any of the other output windings of the other transformers even if all transformers of the matrix are simultaneously supplied with a reading impulse. Therefore only the ends $A_r$ for the left value and $A_s$ for the right value of the transformer $u_x$ receive one impulse each. All the other diode lines, corresponding to other result values than the left value $r$ and the right value $s$ receive no output impulse at all.

FIG. 3 shows a circuit arrangement for generating a series of $r$ impulses at the output end of the circuit arrangement according to FIG. 3, whenever there is an output impulse at the end $A_r$ of FIG. 2. This circuit arrangement is called a parallel to series transforming device since, there being a plurality of such arrangements in the whole of the apparatus—it serves to generate temporally parallel, that is simultaneous series of impulses when receiving input signals from such parallel ends as $A_r$ or $A_s$, the number of pulses in these series representing in coded form the result value $r$ resp. $s$.

In the parallel to series transforming device as shown in FIG. 3 the pairs of terminals 101, 102 . . . 109 are the input ends of the parallel to series transforming device. They are connected to the output ends of the distributing networks over a plurality of interconnecting leads. It is assumed that an input signal may arrive only at one of the input terminals at a time. The parallel to series transforming device has to generate a series of consecutive impulses on the output line 170, whenever such an input signal arrives on one of the parallel input lines, this series consisting preferably of $n$ impulses when the input signal arrives on the $n$th input line.

The parallel to series transforming device is a delay line of several indvidual delay stages connected in series. In this sense the group 111 containing the transformers with saturable cores 121 and 131 forms the first stage of this delay line. The second stage of the line is formed by the group 112 with the transformers 122 and 132. The group 119 shall therefore be the last stage of this delay line. An impulse generated in the transformer 121 with saturable core will, under certain conditions still to be explained, at last reach the end of the delay line 119 after first passing the delay stages 111, 112. This condition is fulfilled for all input impulses which arrive at the input terminal 101 of the parallel to series transforming device, whereas an impulse arriving at the input terminal 102 of the delay stage 112 will only pass through the stages 112 to 119. An impulse arriving at the last terminal 109 will only pass through the last delay stage. The output ends of the individual delay stages are connected over diodes 161, 162 . . . 169 to a common output line 170. Therefore, after an input impulse has arrived at the delay stage 111 there will be an input impulse delivered through the output diode 161 of this stage, and when this input impulse now reaches the delay stage 112 there will be another output impulse delivered to the output diode 162 of this stage and so on. The passing of the input impulse which entered the line at the terminals 101 will therefore generate a series of nine subsequent output impulses on the common output line 170. An input impulse delivered to the terminals 102, however, will effect the generation of eight impulses on the common output line 170 only. Any input impulse arriving on any of the parallel input lines is therefore exactly coordinated to the number of impulses in an impulse series which subsequently leave the common output line of the parallel to series transforming device.

The operation of the transformers with saturable cores forming the delay line will now be described in detail: It may be assumed that at the beginning all transformers may be in their condition of negative saturation. This normal condition is generally maintained by negative impulses arriving alternately on each one of the two advance lines A and B in quick sequence. The negative driver impulses arriving on the advance line A simultaneously read out the transformers 131, 132 etc., whereas the transport impulses arriving on the advance line B read out the transformers 121, 122 etc. during the intervals between consecutive A impulses. If there is a positive input impulse at the terminals 101 entering the transformer 121, this will be changed to its condition of positive saturation. The next driver impulse effects a reverse magnetization and generates a positive impulse at the output winding 141 of this transformer which on its part changes the condition of the transformer 131 to its state of positive saturation. The following A driver impulse changes the condition of the transformer 131 back to negative saturation. At the output winding 151 there will be a positive output impulse firstly going to the input end of the transformer 122 and changing the latter to its condition of positive saturation and secondly passing through the output diode 161 to the common output line 170.

By means of the alternating B and A driver impulses this process is continued until the impulse has left the transformers of the last stage 119 and has in addition to that delivered a last impulse to the output line 170 through the output diode 169. At the end of the output line 170 there is arranged an output transformer with saturable core 180, which serves to regenerate the output impulses weakened through the diodes 161 to 169 and to deliver them to the output terminals 190.

The amplifiying and regenerating effect of such a transformer with saturable core may be explained with reference to the output transformer 180 in detail. The impulses arriving over the common output line 170 at the transformer 180 which have been weakened and deformed by the diodes 161 to 169, may be just sufficient to change the transformer 180 to its condition of positive saturation. In this connection it must be mentioned, that in this direction of the magnetization current there will be generated an impulse in the output winding 181 of the transformer 180, which is of such direction that it is blocked by the diode 182. Therefore it can be said that at this direction of the magnetization current in the transformer 180 the winding 181 can be looked upon as an open circuit. When, however, the next following B driver impulse arrives on the advance winding 183 of the transformer 180 it will change the condition of this transformer 180 back to negative saturation and thereby generate an output impulse in the winding 181 of such polarity that it finds the diode 182 in its open direction. The transformer 180 is therefore loaded with the full output load at the terminals 190 at this direction of the magnetization current. At the moment of the impulse generation the transformer 180 can therefore supply the whole power, delivered to it from the driver current source over the advance winding 183. It therefore works as an amplifying member and its degree of amplification is dependent on the electric conductance of the load at the terminals 190. It is obvious that the above described amplifying process takes place in all the transformers with saturable cores provided for in the whole of the device according to the invention, i.e. for the transformers with saturable cores arranged at the intersection points of the matrix as well as for those forming the parallel to series transforming device.

The amplifying and regenerating characteristics of all these units in the partial arrangements of the above described information transforming device are attained without these elements undergoing a wear and tear which increases over the period of their use.

FIG. 4 shows an example for a distributing network to be selectively controlled by electronic means. The transformer with saturable core 400 generates an impulse in its output windings 401 which is led to the distributing network 410 over a lead 402. This distributing network has three pairs of output lines 420, 421, 430, 431, 440, 441. The output lines 440 and 441 are supposed to supply the output informations $r$ and $s$. For selecting the desired pair of output lines there are lines 450, 451 and 452, which can be selectably blocked by blocking voltages. That means that the leads 440, 441 will be selected by applying a blocking voltage to the leads 450, 451, while applying a blocking voltage to the leads 450, 452 will mean a selection of the output lines 430, 431 and finally applying a blocking voltage to the leads 451, 452 will release the leads 420, 421. The output lines are controlled by the desired functions to be selected by switching over.

The overall circuit diagram of FIG. 5 shows the cooperation of the above described arrangements. Out of two groups of lines 500, 510 the matrix 520 is supplied with two input informations, for instance the lines $l_d$ and $m_b$. At the crossing point the output information $r_s$ may be delivered over the output line $d_b$ to the distributing network 540. There the output information will be split up into one left value $r$ and one right value $s$. Over the output lines 550, 551 . . . 559 these informations being represented by one individual impulse will be delivered to the parallel to series transforming device 560 over the lead $r$ and to the parallel to series transforming device 561 over the lead $s$. As output signals there will be e.g. a series of $r$ (e.g. 5) impulses on the output line 570 and a series of $s$ (e.g. 2) impulses on the output line 571.

What is claimed is:

1. Device for transformation of information by means of a matrix of magnetic cores, which transform a plurality of incoming informations into outgoing informations in logical relationship, comprising a plurality of transformers with saturable cores, arranged respectively at crossing points of the matrix; pulse input means connected with said transformers for selectively changing the normal magnetic saturation of selected cores to oppositely saturated condition representing incoming information; pulse output means respectively connected with said transformers for carrying an output pulse current generated by reversal of the respective transformer core from said oppositely saturated condition to normal saturation, said output means comprising blocking means for preventing current flow therein in direction opposite to that of said output current and comprising distributing circuit means having a plurality of input circuits respectively connected with said transformers via said blocking means and output circuit means and operative to release in said output circuit means variable number series of output impulses the number of which depends upon which one of said input circuits is supplied with an output pulse from the respectively connected transformer; and read-out means connected with said transformers for applying read-out pulses of a polarity and amplitude sufficient for effecting said reversal of saturation in those cores which are in oppositely saturated condition, and for causing thereby output pulses of an amplitude substantially exceeding that of said input pulses.

2. The information transforming device defined in claim 1 wherein said output circuit means include a plurality of output impulse releasing circuit means, and a plurality of circuit selecting means for selecting any one of said output impulse releasing circuit means for the delivery of said series of output impulses.

3. The information transforming device defined in claim 1 wherein said series of output impulses released is representative of the arithmetic combination of the input informations applied to said columns and rows.

4. The information transforming device defined in claim 1 wherein said matrix is operative as an adding member.

5. The information transforming device defined in claim 1 wherein said matrix is operative as a multiplying member.

6. The information transforming device defined in claim 1 including two of said distributing circuit means interconnecting the output of said matrix elements and said plurality of input circuits, one each of said distributing networks being operable to conduct one digit each of a two digit number.

7. The information transforming device defined in claim 1 wherein said distributing circuit means consists of a plurality of OR switches operative to conduct the output informations from said matrix elements to predetermined output terminals of said distributing circuits.

8. In a device for transforming a plurality of input informations into corresponding output informations by logical combination, the combination comprising an electrical matrix having a plurality of columns intersecting a plurality of rows, circuit elements responsive to impulses in said columns and rows connected at each intersection point of said matrix, said elements each having at least one output circuit, a plurality of "parallel to series" transducing means each having a plurality of input circuits and one output circuit and operative to release in said output circuit a number of pulses depending upon which input circuit is excited and distributing circuit means interconnecting the output of said elements of the matrix with said plurality of input circuits over a plurality of parallel conductors, whereby each impulse received at each of said plurality of input circuits will be changed to a corresponding successive number of impulses in said output circuit.

9. Device for transformation of information by means of a matrix of magnetic cores, which transform a plurality of incoming informations into outgoing informations in logical relationship, comprising a plurality of transformers with saturable cores, arranged respectively at crossing points of the matrix; pulse input means connected with said transformers for selectively changing the normal magnetic saturation of selected cores to oppositely saturated condition representing incoming information and including for the purpose of multiplication for each transformer two input circuits for introducing two information elements representing multiplication factors respectively; pulse output means respectively connected with said transformers for carrying an output pulse current generated by reversal of the respective transformer core from said oppositely saturated condition to normal saturation, said output means comprising blocking means for preventing current flow therein in direction opposite to that of said output current and two output circuits for carrying information representing the left-hand and right-hand components of the resulting products; and read-out means connected with said transformers for applying read-out pulses of a polarity and amplitude sufficient for effecting said reversal of saturation in those cores which are in oppositely saturated condition, and for causing thereby output pulses of an amplitude substantially exceeding that of said input pulses.

10. Device according to claim 9, wherein said transformers with saturable cores are so dimensioned that, simultaneously with the increase of the output pulse amplitude with respect to that of the input pulses, a regeneration of the impulse form of said input pulse is obtained.

11. Device for transformation of information by means of a matrix of magnetic cores, which transform a plurality of incoming informations into outgoing informations in logical relationship, comprising a plurality of transformers with saturable cores, arranged respectively at crossing points of the matrix and being "AND" switches operative upon the simultaneous occurrence of unidirectional input current impulses in their respective columns and rows; pulse input means connected with said transformers for selectively changing the normal magnetic saturation of selected cores to oppositely saturated condition representing incoming information; pulse output means respectively connected with said transformers for carrying an output pulse current generated by reversal of the respective transformer core from said oppositely saturated condition to normal saturation, said output means comprising blocking means for preventing current flow therein in direction opposite to that of said output current; and read-out means connected with said transformers for applying read-out pulses of a plurality and amplitude sufficient for effecting said reversal of saturation in those cores which are in oppositely saturated condition, and for causing thereby output pulses of an amplitude substantially exceeding that of said input pulses.

References Cited by the Examiner

UNITED STATES PATENTS

| | | | |
|---|---|---|---|
| 2,639,378 | 5/1953 | Moerman | 235—61 |
| 2,691,155 | 10/1954 | Rosenberg | 235—61 |
| 2,734,184 | 2/1956 | Rajchman | 340—174 X |

OTHER REFERENCES

Pages 1-1-15 to 1-1-16 and drawing Py-O-101, June 30, 1946, "Progress Report (2) on EDVAC," Moore School of Electrical Engineering.

ROBERT C. BAILEY, *Primary Examiner.*

L. MILLER ANDRUS, IRVING L. SRAGOW, MALCOLM A. MORRISON, EVERETT R. REYNOLDS, *Examiners.*

P. P. CONNOR, S. SIMON, M. A. LERNER, *Assistant Examiners.*